United States Patent
Yan et al.

(10) Patent No.: US 10,340,734 B2
(45) Date of Patent: *Jul. 2, 2019

(54) POWER GENERATION SYSTEMS WITH MONITORING FOR ANOMALY DETECTION VIA NONLINEAR RELATIONSHIP MODELING

(71) Applicant: NEC Laboratories America, Inc., Princeton, NJ (US)

(72) Inventors: Tan Yan, Skillman, NJ (US); Dongjin Song, Princeton, NJ (US); Haifeng Chen, West Windsor, NJ (US); Guofei Jiang, Princeton, NJ (US); Tingyang Xu, Willimantic, CT (US)

(73) Assignee: NEC Corporation, Tokyo (JP)

( * ) Notice: Subject to any disclaimer, the term of this patent is extended or adjusted under 35 U.S.C. 154(b) by 96 days.

This patent is subject to a terminal disclaimer.

(21) Appl. No.: 15/680,796

(22) Filed: Aug. 18, 2017

(65) Prior Publication Data

US 2018/0054085 A1 Feb. 22, 2018

Related U.S. Application Data

(60) Provisional application No. 62/377,728, filed on Aug. 22, 2016.

(51) Int. Cl.
*G06K 9/00* (2006.01)
*G06N 7/08* (2006.01)
(Continued)

(52) U.S. Cl.
CPC .......... *H02J 13/0006* (2013.01); *G05B 17/02* (2013.01); *G06F 17/142* (2013.01);
(Continued)

(58) Field of Classification Search
CPC ....... G05B 17/02; G06F 17/142; G06F 17/16; G06F 17/18; G06K 9/00563; G06K 9/6244; G06K 9/6267; G06N 7/08; H02J 13/0006

See application file for complete search history.

(56) References Cited

U.S. PATENT DOCUMENTS

| | | | |
|---|---|---|---|
| 2013/0058447 A1* | 3/2013 | Takeuchi | G21C 17/00 376/241 |
| 2015/0339572 A1* | 11/2015 | Achin | G06N 5/02 706/46 |

(Continued)

OTHER PUBLICATIONS

Nico Görnitz et al., Toward Supervised Anomaly Detection, Journal of Artificial Intelligence Research, Nov. 2012.

*Primary Examiner* — Kenneth M Lo
*Assistant Examiner* — Chad G Erdman
(74) *Attorney, Agent, or Firm* — Joseph Kolodka (57) ABSTRACT

A power generator system with anomaly detection and methods for detecting anomalies include a power generator that includes one or more physical components configured to provide electrical power. Sensors are configured to make measurements of a state of respective physical components, outputting respective time series of said measurements. A monitoring system includes a fitting module configured to determine a predictive model for each pair of a set of time series, an anomaly detection module configured to compare new values of each pair of time series to values predicted by the respective predictive model to determine if the respective predictive model is broken and to determine a number of broken predictive model, and an alert module configured to generate an anomaly alert if the number of broken predictive models exceeds a threshold.

11 Claims, 5 Drawing Sheets

(51) Int. Cl.
*G05B 17/02* (2006.01)
*G06F 17/16* (2006.01)
*G06F 17/18* (2006.01)
*G06F 17/14* (2006.01)
*H02J 13/00* (2006.01)
*G06K 9/62* (2006.01)

(52) U.S. Cl.
CPC .............. *G06F 17/16* (2013.01); *G06F 17/18* (2013.01); *G06K 9/00563* (2013.01); *G06K 9/6244* (2013.01); *G06K 9/6267* (2013.01); *G06N 7/08* (2013.01)

(56) References Cited

U.S. PATENT DOCUMENTS

| | | | |
|---|---|---|---|
| 2016/0076970 A1* | 3/2016 | Takahashi | G06N 20/00 702/33 |
| 2016/0330225 A1* | 11/2016 | Kroyzer | G06F 21/552 |
| 2017/0285086 A1* | 10/2017 | Thompson | G01R 19/04 |
| 2017/0364043 A1* | 12/2017 | Ganti | G05B 13/048 |

* cited by examiner

POWER GENERATION SYSTEMS WITH MONITORING FOR ANOMALY DETECTION VIA NONLINEAR RELATIONSHIP MODELING

RELATED APPLICATION INFORMATION

This application claims priority to U.S. application Ser. No. 62/377,728, filed on Aug. 22, 2016, incorporated herein by reference in its entirety. This application is related to an application entitled "ANOMALY DETECTION FOR COMPLEX PHYSICAL SYSTEMS VIA NONLINEAR RELATIONSHIP MODELING," and which is incorporated by reference herein in its entirety.

BACKGROUND

Technical Field

The present invention relates to anomaly detection and, more particularly, to modeling non-linear relationships between time series to test for abnormal behavior.

Description of the Related Art

Complex physical systems may include thousands of individual components, each having a different set of relationships with the other components. These relationships may be modeled as being, e.g., linear, quadratic, trigonometric, etc. In such a system, the failure of one or more components may lead to a breakdown of the functioning of the entire system.

To address this problem, sensors may be added to monitor different components of the system with a very fine granularity. The readings from the sensors may be modeled as a time series of measured values. Current analysis techniques use kernel regression to model nonlinear relationships in time series. However, these techniques do not respect the underlying physical laws of the system and cannot express the modeled relationship in the form of formulas for diagnosis.

SUMMARY

A power generator system with anomaly detection includes a power generator that includes one or more physical components configured to provide electrical power. Sensors are configured to make measurements of a state of respective physical components, outputting respective time series of said measurements. A monitoring system includes a fitting module configured to determine a predictive model for each pair of a set of time series, an anomaly detection module configured to compare new values of each pair of time series to values predicted by the respective predictive model to determine if the respective predictive model is broken and to determine a number of broken predictive model, and an alert module configured to generate an anomaly alert if the number of broken predictive models exceeds a threshold.

A method for detecting anomalies in a power generation system includes measuring a state of one or more physical components of a power generator using a plurality of sensors, outputting respective time series of said measurements. A predictive model for each pair of a set of time series is determined, each time series being associated with a component of a system. New values of each pair of time series are compared to values predicted by the respective predictive model to determine if the respective predictive model is broken. A number of broken predictive models is determined. An anomaly alert is generated if the number of broken predictive models exceeds a threshold.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide modeling and anomaly detection processes and systems that model the nonlinear, complex relationship between time series generated by sensors. The present embodiments use such models to detect anomalous behavior based on the nature of the physical systems being monitored and on observations from production workload patterns. Not only can the nonlinear relationships between sensors be so identified, but those relationships can be expressed as close-form formulas, greatly assisting operators in the system operators who wish to incorporate their domain knowledge for diagnosis.

Toward that end, a regression function is used to model a non-linear relationship pairs of time series. One time series is fit using the function of another time series. This function is designed respecting the physical laws and workload patterns inside the physical system, providing a template of bases that include, for example, trigonometric and polynomial relationships. For each pair of time series, the regression is fitted by selecting correct bases out of the template. The relationship between each pair is then expressed using the estimated regression function. The fitting problem may be formulated as a Sparse Group Lasso with Overlapping problem. The formulation is further improved by decomposing the coefficient matrix into two matrices that are solved separately, greatly improving the solution speed. After modeling, a function is formulated for every pair of the time series. A set of relationships is selected out of the pairs by choosing those with a high fitness score.

During anomaly detection, the trained models are applied to newly acquired time series. For each pair of time series it is determined whether the pair matches the training model. If so, for each time point in the two time series, a fitted value is generated and compared with the measured value. The trained model is considered broken if the difference between the fitted value and the measured value is high (e.g., if the difference exceeds a threshold). The number of broken models is counted and time points that have a high number of broken models are considered anomalies.

The present embodiments thus accurately identify anomalies, providing early warning to operators to avoid system failure. Explicit sensor relationships are provided to the operators to help them diagnose the potential problems. Large real-world datasets can be processed quickly in this manner.

Figure 1:
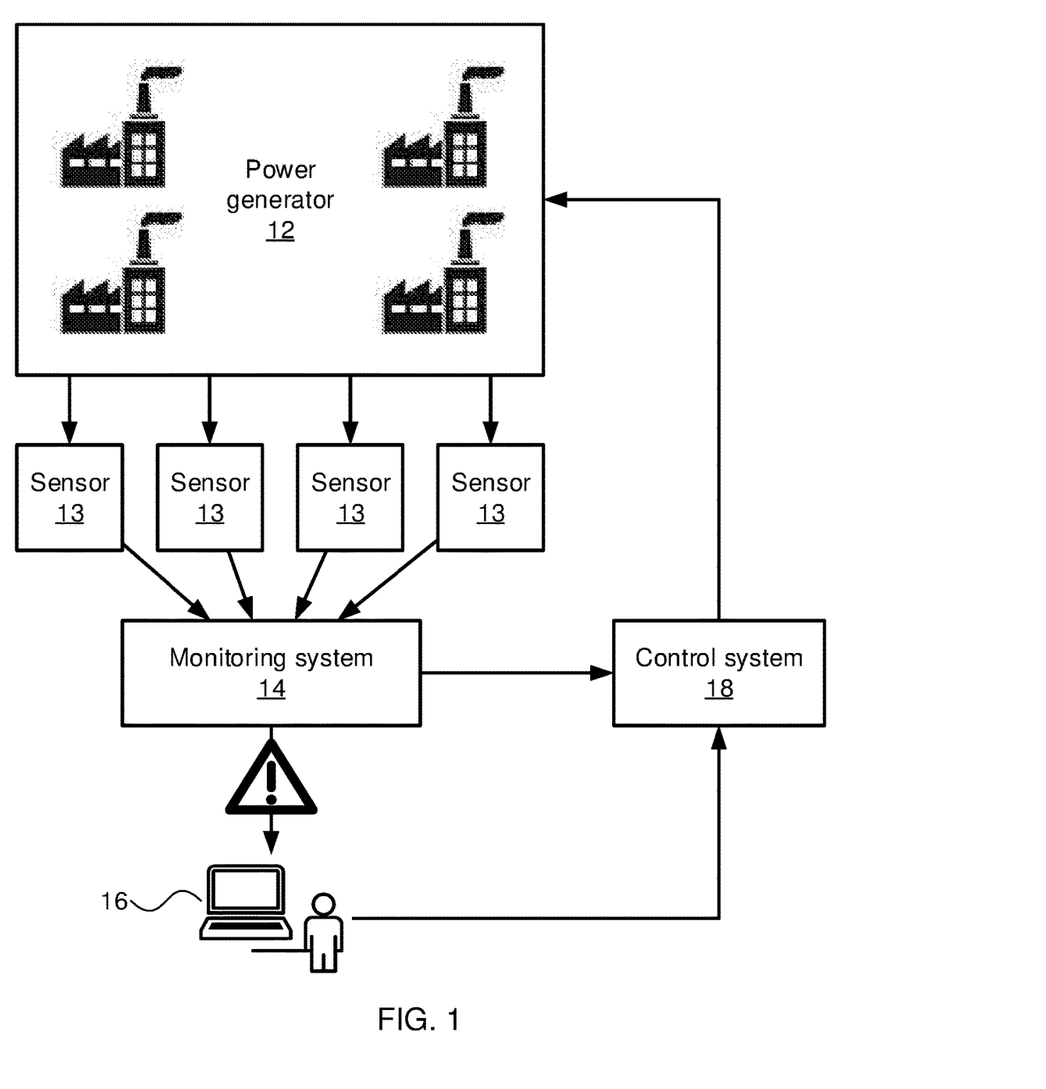
FIG. 1 is a block diagram of a power plant with sensors for physical systems and a monitoring system in accordance with an embodiment of the present invention.

Referring now to FIG. 1, a power plant with a monitoring system is shown. In particular, a power generator 12 is shown that may represent any kind of power generation mechanism including, e.g., solar power, wind power, hydroelectric power, geothermal power, fossil fuel power, nuclear power, etc. The power generator 12 will have a variety of different physical mechanisms and systems, each of which may operate within designed parameters or may malfunction. A plurality of sensors 13 are therefore used to monitor respective physical systems. These sensors 13 may monitor physical properties of the system, including for example temperature, humidity, position, speed, etc., and may also monitor logical properties of the system including, for example, recording logs from software applications and monitoring the status of workloads.

The sensors 13 provide their sensed information to monitoring system 14 which performs analyses on the sensor information. It is particularly contemplated that these analyses identify correlations between different sensor time series and further identify anomalous behavior. The monitoring system 14 reports the results of these analyses to a user 16 and to a control system 18. The control system 18 receives instructions directly from the monitoring system 14 and/or from the user 16 to perform control actions on the power generator 12.

Figure 2:
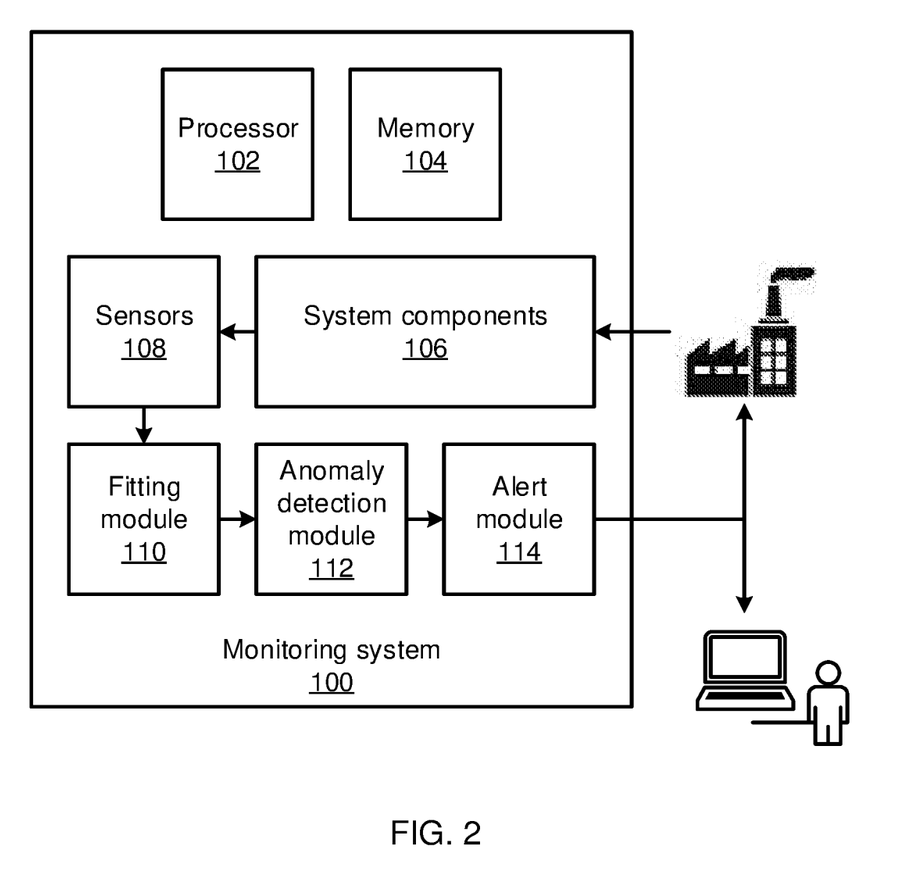
FIG. 2 is a block diagram of a monitoring system for anomaly detection and response in accordance with an embodiment of the present invention.

Referring now to FIG. 2, a monitoring system 100 is shown. The monitoring system includes a hardware processor 102 and memory 104. It should be understood that the monitoring system 100 may be distinct from the monitored system, as shown in FIG. 1, or may be integrated therewith. The monitoring system 100 therefore may include a number of physical components 106, or these physical components 106 may be external to the monitoring system 100. These physical components 106 may include any include any type of device in a complex system such as, e.g., power generator 12. In one specific embodiment the physical components 106 may include, for example, servers in a rack enclosure with their attendant power, cooling, and communications components. The physical components 106 are each fitted with one or more sensors 108 that measure operational parameters of the physical components 106. These operational parameters may include, for example, temperature, power consumption, data throughput, vibrational amplitude, luminosity, physical location, humidity, contaminant concentration, and any other measurable quantity. The sensors 108 store their measurements in memory 104 as time series, with each measurement being stored with a respective timestamp. The sensors 108 keep a common clock, such that measurements stored at a particular time by multiple sensors 108 will share the same, or a very similar, timestamp.

The monitoring system 100 also includes functional modules that may, in some embodiments, be implemented as software that is stored in memory 104 and executed by hardware processor 102. In alternative embodiments, the functional modules may be implemented as one or more discrete hardware components in the form of, e.g., application specific integrated chips or field programmable gate arrays.

A fitting module 110 analyzes a set of time series stored in the memory 104 and generates models that represent the relationship between each respective pair of time series. The models are thus based on historical measurements from the sensors 108 and characterize normal operation of the physical components 106. Anomaly detection module 112 then compares new measurements of from the sensors 108 to the values predicted by the models and, if a sufficient number of discrepancies (referred to herein as "broken models") are found, anomaly detection module 112 flags a particular timestamp as being anomalous.

When an anomaly is found, alert module 114 takes one of a number of actions. In one embodiment, the alert module simply generates an alert to a human operator, including the anomalous timestamp and information regarding the relationships between sensors that are characterized by the broken models. Thus, for example, if a pair of sensors 108 are expected to have a particular trigonometric relationship (e.g., where a first sensor's value is a function of the sine of a second sensor's value) and the physical components 106 in question have deviated from the expected behavior, the report may indicate which physical components 106 are at issue, what the expected behavior was, and what the measured behavior is. The report may also indicate a measure of the magnitude of the anomaly (e.g., the number of broken models).

In another embodiment, the alert module 114 may be configured to take automatic actions to address anomalies. Thus, for example, if the anomaly implicates physical components 106 in a particularly sensitive or dangerous subsystem, the alert module 114 may automatically issue instructions to those components 106 to slow or stop their processes.

Figure 3:
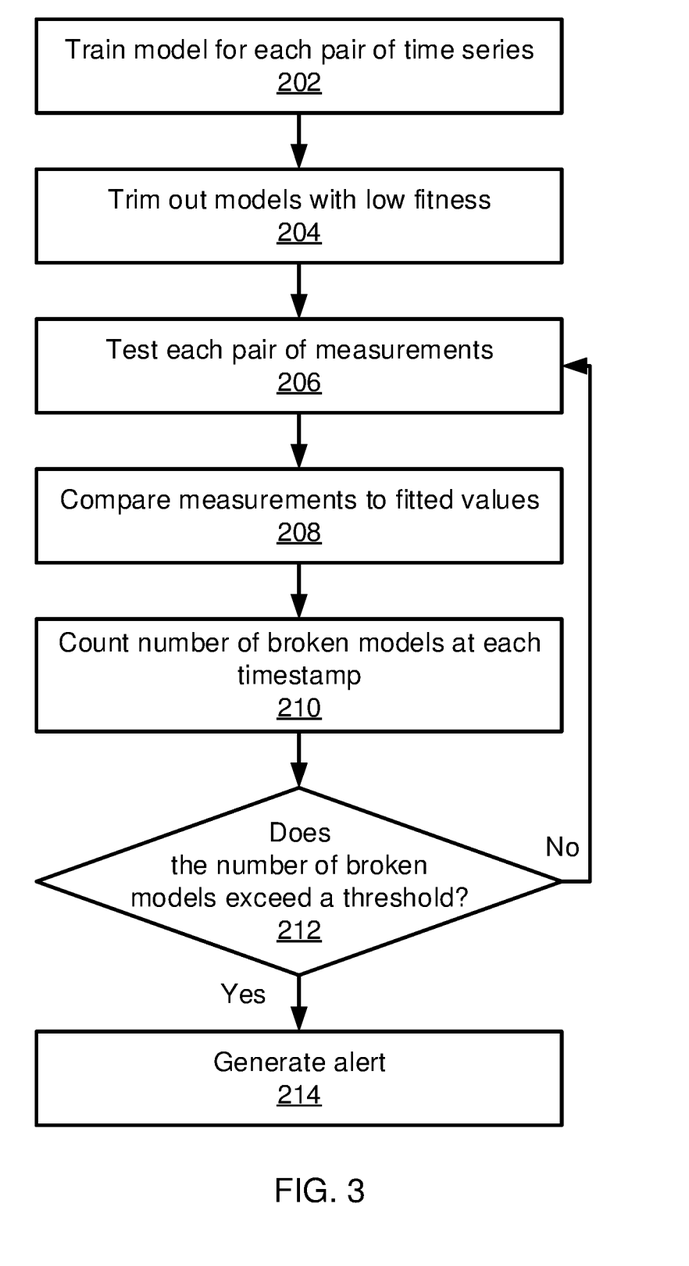
FIG. 3 is a block/flow diagram of anomaly detection and response in accordance with an embodiment of the present invention.

Referring now to FIG. 3, a method for detecting anomalies is shown. Block 202 trains a model for each pair of time series stored in the memory 104. As noted above, each time series corresponds to a respective sensor 108 that measures a physical component 106. The model training will be described in greater detail below. Block 204 then trims out the models that have a fitness score below a threshold value. The fitness score may be based on, e.g., the r-squared error.

Block 206 tests pairs of current measurements from the sensors 108 against the respective models. Block 210 then counts the number of broken models at each timestamp (i.e., the number of pairs for which the measured values differ from values predicted by the model by more than a threshold amount).

Block 212 determines whether a number of broken models exceeds an anomaly threshold. If not, processing returns to block 206 and the current measurements from the sensors 108 at a new timestamp are tested. If the number of broken models does exceed the anomaly threshold, then block 214 generates an alert by, e.g., sending a report to a human operator or taking an automated administrative action.

Figure 4:
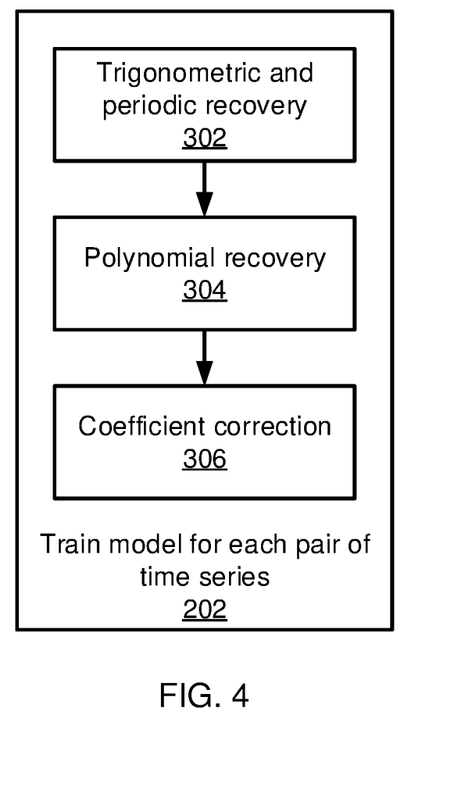
FIG. 4 is a block/flow diagram of training predictive models for pairs of time series in accordance with an embodiment of the present invention.

Referring now to FIG. 4, additional detail is shown on model training 202. Given two time series, x and y, trigonometric and periodic recovery 302 determines whether there is a functional relationship between the time series that can be expressed as $y(x)=g(x)+m$. Polynomial recovery 304 determines whether there is a functional relationship between the time series that can be expressed as $y=g(x)+h(x)$. Block 306 performs coefficient correction for the discovered functions.

Periodic signals can be cleanly separated out from polynomial signals using a fast Fourier transform (FFT), which turns a time-domain series into a frequency-domain series, showing high amplitudes for periodic components. Nonperiodic components are separated out from both the periodic components and from the noise. The relationships between the time series can therefore be expressed as $y(x)=f_{periodic}(x)+f_{nonperiodic}(x)+\varepsilon$, where $f_{periodic}(\cdot)$ represents the periodic component with a mean of zero and $f_{nonperiodic}(x)$ represents the polynomial component. Periodic patterns may result from repeated workload patterns. Periodic components are shown as peaks in higher-frequency portions of the FFT output, while nonperiodic components are shown as a peak in the low-frequency portion of the output. Thus, after block 302 finds the periodic components, block 304 can operate on only the nonperiodic portion.

Block 302 further determines the time shift of the periodic component, with values for x at different points in the time series being used in the FFT. The results using incorrect time shifts will show only noise, while strong signals will be evident at particular frequencies when the time shift is correct.

The fitting error (also known as the residue) is used as an input for the polynomial relationship discovery in block 304. For the two time series x and y, x is considered the independent signal and y is considered the response signal. The time series x is extended to d different power bases as $k(x;i)=[x_i, x_i^2, x_i^3, \ldots, x_i^d]$. The interactions between the two signals are extended to an autoregressive kernel as $k_{(x,y;i)}=[y_i, \ldots, y_i^d, x_i, y_i x_y, y_i x_i^2, \ldots y_i^d x_i^{d-1}, y_i^d x_i^d]$. Each power base includes the current sensor value and τ previous sensor values. A (τ+1)×d(d+2) kernel matrix is defined as:

$$K_{(x,y;t)} = \begin{bmatrix} k_{(x;t)}^T & k_{(x;t-1)}^T & \cdots & k_{(x;t-\tau)}^T \\ 0 & k_{(x,y;t-1)}^T & \cdots & k_{(x,y;t-\tau)}^T \end{bmatrix}$$

Each matrix $k_{(x,y;t)}$ in $K_{(x,y;t)}$ is set to zero because the values for $y_t$ in $k_{(x,y;t)}$ cannot be modeled on $y_t$ itself. Given N total measurements for each signal, the index t of $K_{(x,y;t)}$ starts from r+1 to have enough delays in the first training example. If $K_{(x,y;t)}$ is a feature matrix, then a model with τ delays can be expressed as:

$$y_t = tr(K_{(x,y;t)}^T W)$$

where W is a model parameter matrix.

The underlying physical laws that determine the relationship models sparsely rely on only a few bases. Furthermore, physical objects and events need time to propagate through a system. As a result, sensors at different locations may monitor the same event at different times, making their relationship sparsely rely on a time lag that is determined by their physical distance. This shows that the sensor relationships should sparsely appear in certain bases and delays. To select among bases and discover the certain delay time points in the kernels, block 304 treats each base with the same orders as a group and all the bases at each delay as a group. In other words, each row of $K_{(x,y;t)}$ is a structured group, where all the bases are at a same delay, and each column is a structured group, with the same base at all delays. Regularizers are applied to the model parameter matrix W to select relevant groups of bases and delays and to add sparsity within the groups to control the model capacity.

Block 204 therefore forms an optimization problem as a sparse group lasso with overlapping structures:

$$\min_{P,Q} \ell(W) + 1(1-\alpha)\lambda_1 \sum_{g=1}^{G} \Omega_g(W) + \alpha\lambda_2 \|W\|_1$$

where $\ell(W)=\Sigma_{t=1}^{N}\|y_t-tr(K_{(x,y;t)}^T W)\|_2^2$, $tr(\cdot)$ represents the trace of a matrix, g is a particular group from the set of groups G, and $\alpha$, $\lambda_1$, and $\lambda_2$ are tuning parameters. $\Omega_g(\cdot)$ refers to a structured-sparsity-inducing penalty and plays a role in encouraging closely related inputs to be selected jointly as relevant to the output by setting the corresponding regression coefficients to non-zero values based on the $\ell_1/\ell_2$ mixed-norm.

Although W has overlapping structures, the present embodiments provide a special case because the parameters naturally form a matrix, where row groups only overlap with column groups, but never with themselves. Similarly, column groups only overlap with row groups, but never with themselves. As a result, W can be decomposed into a summation of two components, P and Q, with only row groups being selected in P and column groups being selected in Q. Both rows and columns are selected in W after summation. This decomposition degenerates the regularization part of the original selection to two easier, sparse group Lasso penalties on both P and Q.

To model the regularization part, the $\ell_{1,2+1}$ matrix norm can be used. More particularly, the $\ell_{1,2+1}$ norm is applied row-wise to P and the optimal solution of P will include mostly rows with all-zero entries and a few rows with non-zero entries. Similarly, the $\ell_{1,2+1}$ norm of $Q^T$ encourages selection among columns of Q.

The regularization is therefore rewritten in terms of P and Q as:

$$\min_{P,Q} \ell(W) + \alpha(\lambda_1\|P\|_1 + \lambda_2\|Q\|_1) + (1-\alpha)(\lambda_1\|P\|_{1,2} + \lambda_2\|Q\|_{1,2})$$

where W in the least loss is replaced by P+Q. The parameter $\alpha$ plays a role of balancing the weight between the $\ell_{1,2}$ norm and the $\ell_1$ norm. Although the regularization is decomposed into two sparse group Lasso penalties, the least squares loss part is not. In addition, P and Q are estimated together, because they both contribute to the optimal solution of W. Therefore existing sparse group Lasso solvers are inadequate to address this problem.

The optimization problem can be iteratively solved using fast iterative shrinkage-thresholding algorithm. To fit the optimization algorithm, the optimization problem may be reformulated as:

$$\min_{B,Q} \langle \nabla_P \ell_\mathcal{K}, P-\tilde{P}_\mathcal{K} \rangle + \langle \nabla_Q \ell_\mathcal{K}, Q-\tilde{Q}_\mathcal{K} \rangle +$$

$$\frac{L}{2}\|P-\tilde{P}_\mathcal{K}\|_F^2 + \frac{L}{2}\|Q-\tilde{Q}_\mathcal{K}\|_F^2 + R(P,Q)$$

where $\langle \cdot, \cdot \rangle$ denotes an inner product, R(P,Q) is the non-smooth part that constitutes the regularizers, $\mathcal{K}$ is an iteration number, $\ell$ is the continuously differentiable part, $\nabla_P \ell \mathcal{K}$ and $\nabla_Q \ell \mathcal{K}$ are the partial derivatives of $\ell$ at $(\tilde{P}\mathcal{K}, \tilde{Q}\mathcal{K})$, $\tilde{P}\mathcal{K}$ and $\tilde{Q}\mathcal{K}$ are defined as:

$$\tilde{P}_\mathcal{K} = P_{\mathcal{K}-1} + \left(\frac{t_{\mathcal{K}-1}-1}{t_\mathcal{K}}\right)(P_{\mathcal{K}-1} - P_{\mathcal{K}-2})$$

-continued $$\tilde{Q}_{\mathcal{K}} = Q_{\mathcal{K}-1} + \left(\frac{t_{\mathcal{K}-1}-1}{t_{\mathcal{K}}}\right)(Q_{\mathcal{K}-1} - Q_{\mathcal{K}-2})$$

t𝒦 is a scalar that is updated at each iteration as:

$$t_{\mathcal{K}+1} = \frac{1 + \sqrt{1 + 4t_{\mathcal{K}}^2}}{2}$$

and where L is an upper bound of the Lipschitz modulus.

The iteration number K is initialized to one, $t_1$ is initialized to one, and $P_0=\tilde{P}_1=Q_0=\tilde{Q}_1=0$. The optimization problem is solved to obtain P𝒦 and Q𝒦. The value of t𝒦$_{+1}$, $\tilde{P}$𝒦$_{+1}$, and $\tilde{Q}$𝒦$_{+1}$ are calculated as described above. The iteration number 𝒦 is incremented and these steps are repeated. Iteration continues until the values for P𝒦 and Q𝒦 converge. The optimization converges to an optimal solution with a convergence rate of $$o\left(\frac{1}{\mathcal{K}^2}\right).$$

As noted above, the sum of the final values of P and Q is the parameter matrix W.

A template of bases is generated using different orders of polynomial relationships with different time delays. Bases are generated with at most degree-d and τ delays to model y as a function of x. Thus the function is expressed as:

$$y_t = tr\left(\begin{bmatrix} x_t & \cdots & x_t^d \\ \vdots & \ddots & \vdots \\ x_{t-\tau} & \cdots & x_{(2,t-\tau)}^d \end{bmatrix} \times \begin{bmatrix} w_{(1,1)} & \cdots & w_{(1,\tau)} \\ \vdots & \ddots & \vdots \\ w_{(d,1)} & \cdots & w_{(d,\tau)} \end{bmatrix}\right)$$

The x terms are bases, while the w terms are learning coefficients of the parameter matrix W. The problem is formulated as Sparse Group Lasso with Overlapping and can be solved efficiently. The output of block 304 is an estimated function for each pair of the time series.

Block 306 corrects the coefficients of the functions generated by block 304. After solving the Group Lasso problem, the feature coefficients are set to zero and non-zero values (such that particular coefficients are selected or deselected). The non-zero valued features may not represent the true coefficients. Block 306 corrects these coefficients using linear regression, regressing each estimated function to the time series to minimize the regression error. For example, if the coefficients in the estimated function are too large, a non-normalized kernel $K_S$ can be used to fit the regression, where:

$$K_S = [k_{d_1,\tau_1}(1:T), \ldots, k_{d_S,\tau_S}(1:T)]$$

$$\hat{W} = (K_S^T K_S)^{-1} K_S x_1$$

The result is that the coefficient matrix $\hat{W}$ is reduced in magnitude.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
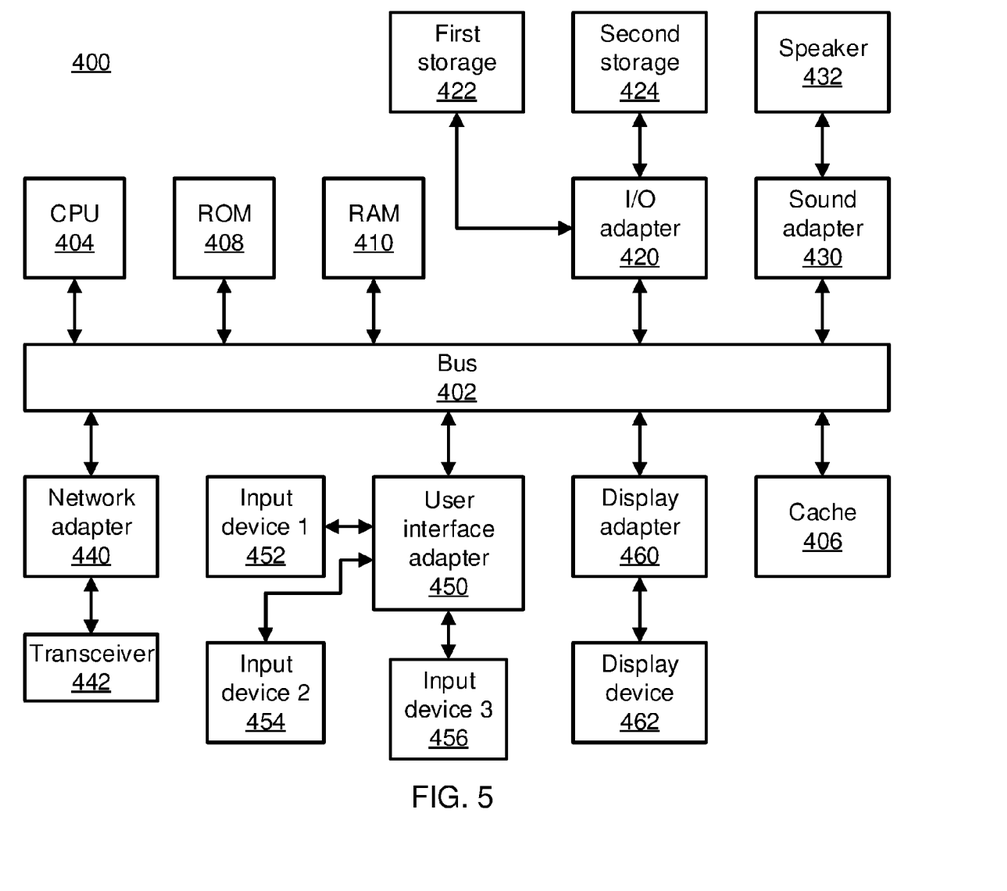
FIG. 5 is a block diagram of a processing system in accordance with an embodiment of the present invention.

Referring now to FIG. 5, an exemplary processing system 400 is shown which may represent the monitoring system 100. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A power generator system with anomaly detection, comprising:
 a power generator that includes one or more physical components configured to provide electrical power;
 a plurality sensors configured to make measurements of a state of respective physical components, outputting respective time series of said measurements; and
 a monitoring system, comprising:
 a fitting module configured to determine a predictive model for each pair of a set of time series, to determine polynomial bases for modeling a polynomial relationship between the time series, to solve a corresponding Sparse Group Lasso problem for the set of time series, and to correct coefficients of a solution of the corresponding Sparse Group Lasso problem by linear regression;
 an anomaly detection module configured to compare new values of each pair of time series to values predicted by the respective predictive model to determine if the respective predictive model is broken and to determine a number of broken predictive models; and
 an alert module configured to generate an anomaly alert if the number of broken predictive models exceeds a threshold.

2. The power generator system of claim 1, wherein the fitting module is further configured to determine a periodic relationship between the time series and a non-periodic relationship between the time series.

3. The power generator system of claim 1, wherein the fitting module is further configured to perform a Fourier transform on the time series to separate periodic components from non-periodic components.

4. The power generator system of claim 1, wherein the fitting module is further configured to determine a time delay between time series that have a periodic relationship.

5. The power generator system of claim 1, wherein the anomaly detection module is further configured to use only predictive models that have a fitness score higher than a threshold.

6. The power generator system of claim 5, wherein the fitting module is further configured to calculate a fitness score for each predictive model based on an r-squared error.

7. A method for detecting anomalies in a power generation system, comprising:
 measuring a state of one or more physical components of a power generator using a plurality of sensors, outputting respective time series of said measurements;
 determining a predictive model for each pair of a set of time series, each time series being associated with a component of a system, including determining a period relationship between the time series and a non-periodic relationship between the time series, wherein determining the non-period relationship between the time series includes determining polynomial bases for modeling a polynomial relationship between the time series, solving a corresponding Sparse Group Lasso problem for the time series, and correcting coefficients of a solution of the corresponding Sparse Group Lasso problem by linear regression;
 comparing new values of each pair of time series to values predicted by the respective predictive model to determine if the respective predictive model is broken;
 determining a number of broken predictive models; and
 generating an anomaly alert if the number of broken predictive models exceeds a threshold.

8. The method of claim 7, wherein determining the predictive model for a pair of time series further comprises performing a Fourier transform on the time series to separate periodic components from non-periodic components.

9. The method of claim 7, wherein determining the predictive model for a pair of time series further comprises determining a time delay between time series that have a periodic relationship.

10. The method of claim 7, wherein comparing values of each pair of time series only uses predictive models that have a fitness score higher than a threshold.

11. The method of claim 10, further comprising calculating a fitness score for each predictive model based on an r-squared error.

* * * * *